United States Patent [19]

Steffen

[11] Patent Number: 4,718,071
[45] Date of Patent: Jan. 5, 1988

[54] GAS LASER EQUIPPED WITH TRIPLE FUNCTION VALVES

[75] Inventor: Jürg Steffen, Sigriswil, Switzerland

[73] Assignee: Asulab S.A., Switzerland

[21] Appl. No.: 941,465

[22] Filed: Dec. 15, 1986

[30] Foreign Application Priority Data

Dec. 16, 1985 [FR] France .................. 85 18745

[51] Int. Cl.$^4$ .............................................. H01S 3/03
[52] U.S. Cl. .................................. 372/61; 372/58; 372/33
[58] Field of Search ............... 372/33, 58, 59, 55, 372/109, 61

[56] References Cited

U.S. PATENT DOCUMENTS 3,605,038  9/1971  Byrne et al. .................. 372/55
3,851,273  11/1974  Hoag et al. .................. 372/104
4,646,310  2/1987  Koseki .................. 372/58

FOREIGN PATENT DOCUMENTS 0048690  3/1982  European Pat. Off. .
2497009  6/1982  France .
0047785  3/1984  Japan .................. 372/61

Primary Examiner—William L. Sikes
Assistant Examiner—Bertha Randolph
Attorney, Agent, or Firm—Griffin, Branigan & Butler

[57] ABSTRACT

In a gas laser including a discharge tube forming a resonant cavity, a mirror disposed at each end of the cavity, a pump, a gas source and a manometer, a first valve is connected between one end of the tube and a first of the mirrors and a second valve is connected between the other end of the tube and a second of the mirrors. Within the body of each valve is a moving element which may assume a first working position, a second position permitting mirror access and a third position for changing gas. This arrangement permits changing mirrors and/or replacing gas without exposing the cavity to atmospheric pressure and without loss of time.

9 Claims, 8 Drawing Figures

GAS LASER EQUIPPED WITH TRIPLE FUNCTION VALVES

This invention concerns a gas laser including a resonant cavity terminated by a first and a second mirror, a discharge tube located between said mirrors, a gas source, the discharge rate of which is controllable, a manometer to measure the gas pressure prevailing within the cavity and pumping means adapted inter alia to remove air or gas from within the cavity.

BACKGROUND OF THE INVENTION

In order to enable utilization as widespread as possible of a gas laser, it is desirable not only to be able to change the mirrors at the ends of the resonant cavity, but further to change the type of gas employed as an amplifying medium and contained within the discharge tube.

The laser model 2020 offered by the Company Spectra-Physics, Mountain View (USA), consists of a sealed discharge tube terminated by a pair of Brewster windows. This tube is mounted in a chassis which carries the mirrors. Such system, referred to as modular, gives ready free access to the mirrors since the latter are located outside the sealed tube, but it does not enable working with different gases and if such were to be the case, it would be necessary to change the entire tube, this being moreover foreseen in the notice published by the company in question. Here it should be also mentioned that the employment of Brewster windows is undesirable since these windows bring about a serious loss of power, such power being reduced to about half of that which one may attain if such windows are absent. The laser, as mentioned hereinabove, nevertheless enables changing the mirrors without touching the discharge tube. This possibility is desirable, initially for maintenance reasons, since it is necessary to be able to replace a mirror which is simply defective or the reflecting coating of which has become altered. Finally, one must be able to employ mirrors, the curvature of which is different in order to obtain different transverse electromagnetic modes (TEM). Finally, in changing the nature of the reflecting coating placed on the mirror, one may modify the spectral composition of the laser beam.

In contrast to the arrangement which has just been described above, the laser apparatus described in European patent No. 0.048.690 enables changing the gas contained in the discharge tube. To this effect are provided a first pumping valve and a second filling valve. However, here the mirrors are in direct communication with the discharge tube and it will be understood that it will not be possible to change them without bringing the entire interior of the discharge tube to atmospheric pressure. This presents the difficulty of having once again to evacuate the cavity following changing of the mirror and before introducing the gas, and takes considerable time which may extend for large dimension lasers over several days. On the other hand, if it were possible to isolate the mirrors of the discharge tube, one could during this operation maintain a very low pressure in the tube so as to enable rendering the laser once again operational after very little time lapse. It will be observed that changing the gas enables modification of the spectral composition of the laser beam; for instance, argon produces a blue and green tint and krypton a yellow and red tint.

It is the purpose of the present invention to overcome the difficulties presented by one or the other of the lasers previously described by placing into operation means permitting for the same laser apparatus a change of mirrors in the cavity and/or replacement of the gas by another gas without exposing the discharge tube to atmospheric pressure.

SUMMARY OF THE INVENTION

To attain this purpose, the invention provides a gas laser including a resonant cavity terminated by a first and a second mirror, a discharge tube located between said mirrors, a gas source the discharge rate of which is controllable, a manometer to measure the gas pressure prevailing within the cavity, pumping means adapted, inter alia, to remove air or gas from within the cavity, a first valve placed between the first end of the tube and the first mirror and a second valve placed between the second end of the tube and the second mirror, said valves being adapted to enable communication at least between the pumping means and the resonant cavity, each said valve including a body pierced with orifices and a movable element fitted within said body and adapted to assume a first working position in which the luminous beam produced in the discharge tube traverses the valves to reach the mirrors, the pumping means being isolated from the cavity, a second position for permitting mirror access in which said mirrors are isolated from the discharge tube and the pumping means and a third position for changing gas in which the cavity is placed in communication with the pumping means thereby to remove the gas contained in said cavity.

DESCRIPTION OF THE PREFERRED EMBODIMENT

Figure 1:
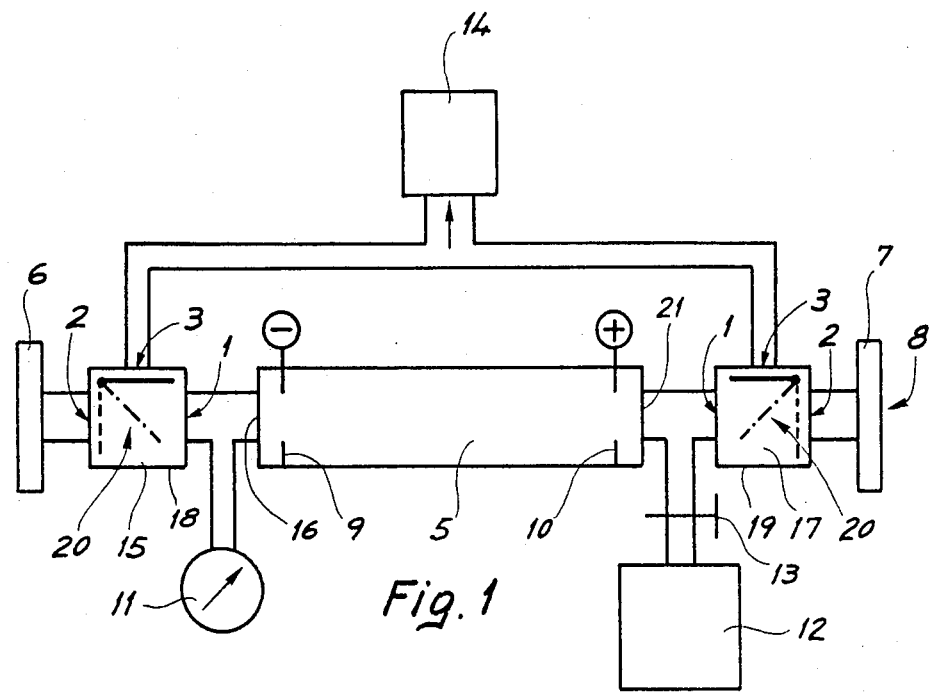
FIG. 1 is a schematic representation of the gas laser according to a first embodiment of the invention.

FIG. 1 is a schematic representation of the gas laser according to a first embodiment and according to the most preferred version. The laser includes a discharge tube 5, a good description of which will be found in the European patent No. 0.048.690 cited hereinabove. This tube is located between first and second mirrors 6 and 7 which form together with it the resonant cavity 8. The gas contained in the tube is ionized by cathode 9 and an anode 10 coupled to a DC energy source symbolized by the signs + and −. Constructional details concerning the electrodes as well as the entire cooling system of the tube are likewise apparent in the above cited patent. A manometer 11 for measuring the gas pressure contained in the cavity 8 and a source of gas 12 the discharge rate of which may be controlled by a valve 13 are placed in communication in one manner or another with the cavity 8. Pumping means 14 are provided in order to enable inter alia either to remove the air from the interior of the cavity when it must be evacuated for the first time or to pump gas which is found therein when it is necessary to replace this gas by another. It will be seen subsequently that pumping means 14 may likewise serve to effect circulation of fresh gas within the apparatus.

FIG. 1 shows that the laser according to the invention comprises a first valve 15 interposed between the first end 16 of the tube 5 and the first mirror 6, and a second valve 17 interposed betewen the second end 21 of tube 5 and the second mirror 7, and that said valves are capable of placing into communication at least the pumping means 14 and the cavity 8. Each of valves 15 and 17 comprises a fixed valve body symbolized respectively by references 18 and 19 and including in the example of FIG. 1 three orifices shown by references 1, 2 and 3. In each of valve bodies 18 and 19 is fitted a movable element 20. This element may be placed in a first position as shown by the full line for which the luminous beam produced in the discharge tube traverses valves 15 and 17 to reach mirrors 6 and 7. This is the normal position when the laser is functioning. The movable element may further be placed in a second position corresponding to the dotted line in which mirrors 6 and 7 are isolated from the discharge tube 5 and the pumping means 14. This is the valve position for access to the mirrors in which said mirrors may be changed without changing the pressure conditions prevailing within the tube. The movable element may finally be placed in a third position corresponding to the dot and dash line for which the cavity 8 is placed in communication with the pumping means 14 to effect evacuation of air or gas contained in the cavity. This position is referred to as the pumping position.

It is seen thus that by this arrangement it is a very simple matter either to change the mirrors or to change the gas without the necessity of exposing the cavity to atmospheric pressure and that such operations may be realized by means of two valves, each of which may be placed in three different functional positions.

In this first embodiment, it is noted also that the manometer 11 is placed in communication with cavity 8 at a place situated between valve 15 and the end 16 of tube 5. In the same manner the gas source 12 is placed in communication with the cavity 8 at a place situated between valve 17 and the end 21 of the tube 5. In this case each of valves 15 and 17 has three orifices 1, 2 and 3. It will be understood however that one may benefit from the presence of the valves to place cavity 8 in communication with manometer 11 by the first valve 15 and with the gas source 12 by the second valve 17. This case is shown in the following figures and the valves are therein provided with four orifices.

Figure 2:
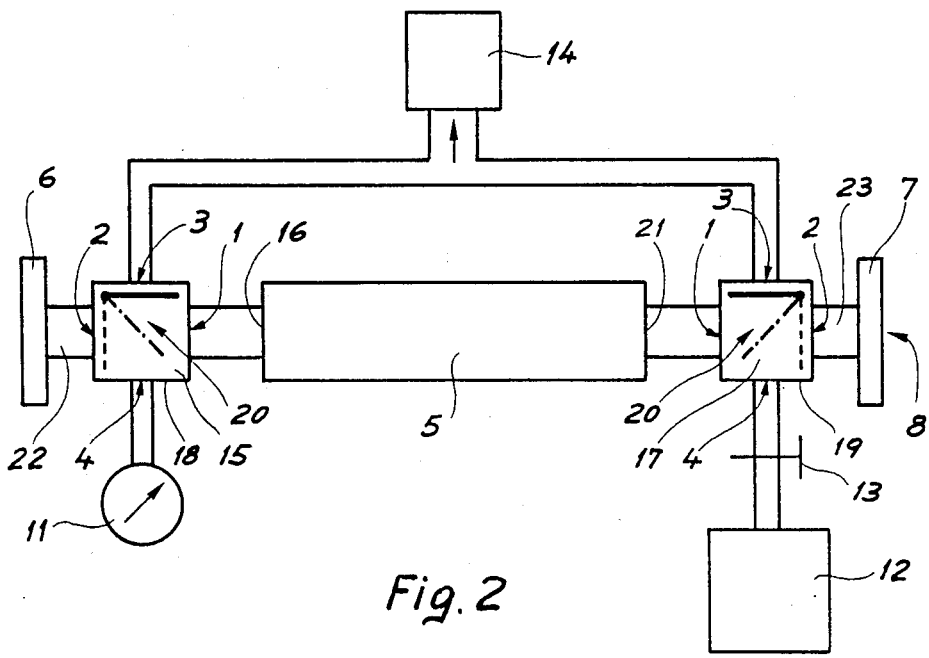
FIG. 2 is a schematic representation of a gas laser according to a second embodiment of the invention.

FIG. 2 is a second embodiment of the invention and repeats in principle what has just been described with respect to FIG. 1. Body 18 of the first valve includes a first orifice 1 coupled to the discharge tube 5, a second orifice 2, coaxial with the first coupled to a first chamber 22 supporting the first mirror 6, a third orifice 3 the axis of which intersects the axis of the first and second orifices at substantially a right angle, and coupled to the pumping means 14 and a fourth orifice 4 coaxial with the third coupled to manometer 11. In the same manner, body 19 of the second valve includes a first orifice 1 coupled to the discharge tube 5, a second orifice 2 coaxial with the first coupled to a second chamber 23 supporting the second mirror 7, a third orifice 3, the axis of which intersects the axis of the first and second orifices at substantially a right angle, and which is coupled to the pumping means 14, and a fourth orifice 4, coaxial to the third, coupled to the gas source 12.

Figure 3:
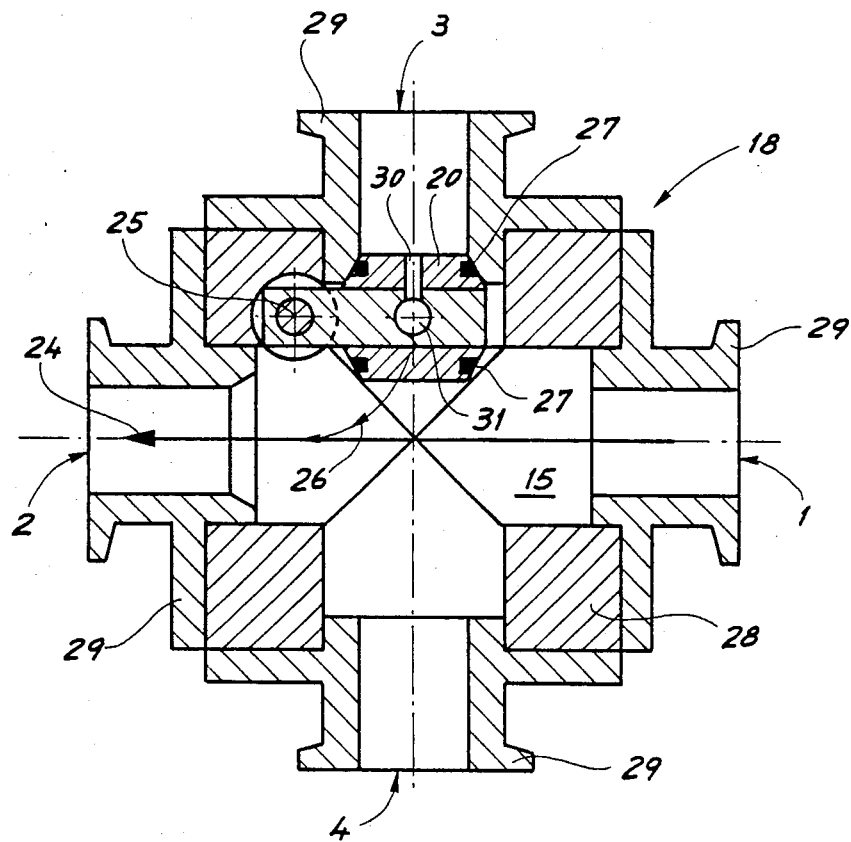
FIG. 3 is a cross-section of one of the valves shown on FIG. 2.

FIG. 3 is a cross-section of the valve 15 shown on FIG. 2. The valve comprises valve body 18 and a movable element shown in the form of a flap 20. Flap 20 may pivot about a rotation axis 25 located outside the path traversed by the luminous beam reflected by the mirrors, this path being symbolized by arrow 24. Axis 25 is controlled by a handle (not shown). In FIG. 3, the flap is shown arranged in a first position for which the third orifice 3 of the valve body is obstructed. This situation is that employed during operation of the laser. Should one now wish to isolate the mirror situated in the elongation of the output 2 of the valve, the flap 20 will be caused to pivot 90° in the direction of arrow 26. The second orifice 2 of the valve body is then obstructed, which enables replacing the mirror without exposing the cavity to atmospheric pressure. Finally, if the flap is arranged in a third position situated half-way between the first and second positions, none of the four orifices of the valve is obstructed. The gas present in the cavity may be evacuated, then replaced by a gas of another type, the introduction of the new gas being obtained via orifice 4 of valve 17 shown on FIG. 2.

The drawing of FIG. 3 shows that arrangements are made to assure sealing of flap 20, such arrangements being shown in the form of O-ring seals 27. As may be further seen on the drawing, the valve body 18 comprises mainly a cubical body 28 pierced by four orifices on each of which is fitted a portal 29. Valve 17 shown on FIG. 2 is identical to that which has just been described for reasons of symmetry, it being understood that it is shown in the same manner but turned through 180° about the axis 3-4.

FIG. 3 shows further that the first valve 15 is provided with a shunt arrangement to enable a circulation of fresh gas should such be judged necessary. To this effect flap 20 is provided with a first passage 30 ending in a second passage 31. Passage 31 may be blocked by a stem (not shown) but accessible from the exterior of the valve. If gas circulation is wished, one unblocks passage 31. There will then be circulation of fresh gas over the following route: gas source 12, valve 13, discharge tube 5, valve 15, shunt circuit 31-30 and pumping means 14 (see FIG. 2). It is evident that if valve 17 is provided with the same circulation system, it will be necessary to maintain its passage 31 closed in order that said circulation occurs according to the path as mentioned.

Figure 4A:
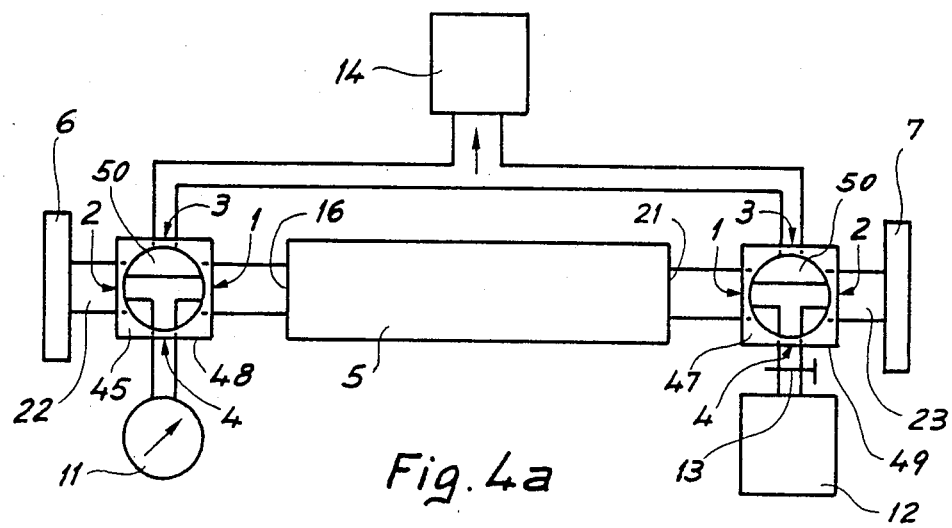
FIGS. 4a, 4b and 4c are schematic representations of the gas laser according to a third embodiment of the invention, each of the representations showing different functions.
Figure 4B:
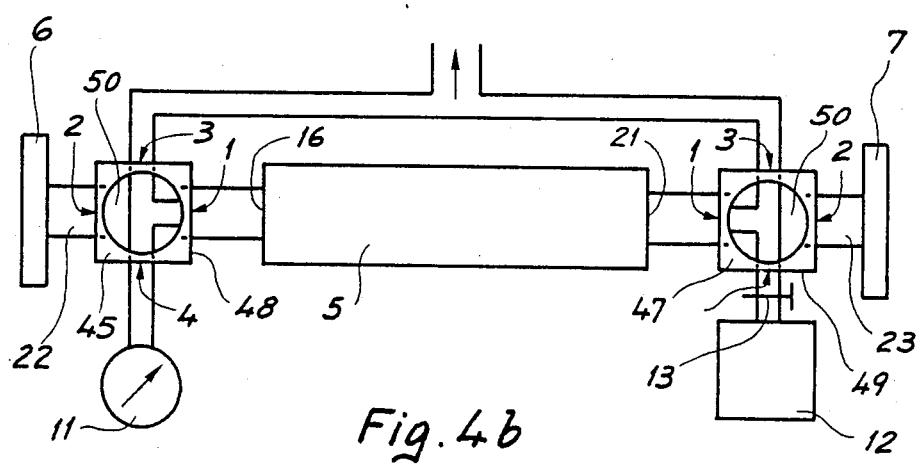
Figure 4C:
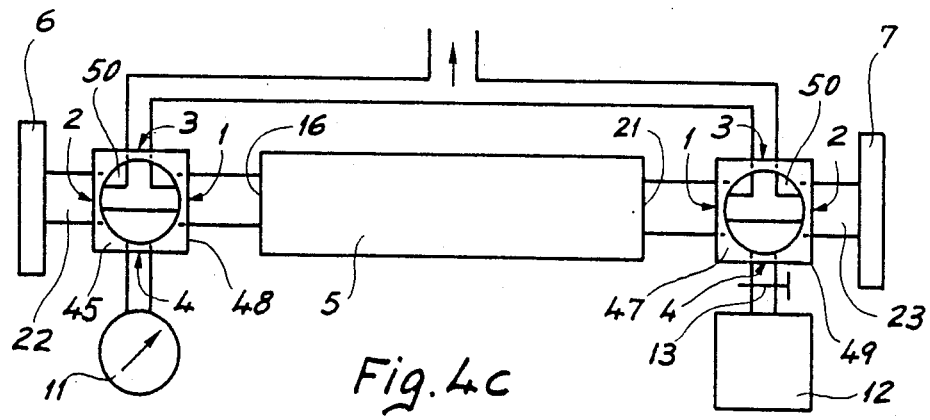

FIGS. 4a, 4b and 4c are schematic representations of a gas laser according to a third embodiment of the invention. The general arrangement of the system is similar to that explained with reference to FIG. 2, except insofar as the valves 45 and 47 are concerned, the conception of such valves being different. Thus there will be found in the FIGS. 4a to 4c the discharge tube 5, mirrors 6 and 7, pumping means 14, manometer 11 and gas source 12 with the associated valve 13. Valves 45 and 47 each comprise a valve body 48 and 49 including four orifices 1 to 4. These orifices are coupled to the parts comprising the laser in the same manner as that which has been described hereinabove for the other embodiments. The movable element 50 fitted into the valve body provides an opening in the form of a T which simultaneously places into communication three of the orifices of the valve body. This is a preferred embodiment which is more easily manufactured.

FIG. 4a shows the laser in its operating position. Orifices 1 and 2 are coupled by the transversal branch of the T and the beam produced in the tube 5 may attain mirrors 6 and 7. In this situation, manometer 11 is coupled to the cavity by the input 4 of valve 45 and the gas source 12 is likewise coupled to the cavity by the input 4 of valve 47. The interior working pressure (on the order of 0.1 to 10 mbar) may thus be verified and injection of fresh gas may be controlled by valve 13.

FIG. 4b shows the laser during changing of mirrors 6 and 7. Here the mirrors are isolated from the tube 5 and may be changed without changing the pressure prevailing in the tube.

FIG. 4c shows the laser while undergoing changing of the gas. Herein the existing gas is pumped by the pumping means 14. It will be understood that the evacuation operation thus conceived is of short duration since the cavity has not been subjected to atmospheric pressure. This situation enables pumping the air which has penetrated in chambers 22 and 23 if the preceding operation has been a mirror change. Finally, it is further possible in this situation to perform the first evacuation in the cavity during a procedure of putting into operation. In this latter case a supplementary manometer (not shown) may be present at the pump side, which will enable checking the high vacuum which must be attained (on the order of $10^{-5}$ to $10^{-6}$ mbar).

To change from one situation to the other, the movable element 50 on the left is turned in the counter clockwise sense and the movable element 50 on the right in the clockwise sense, both through a quarter of a turn. To go from the situation of FIG. 4c to that of FIG. 4a, the movable element 50 is rotated a half-turn in one or the other senses.

Figure 5:
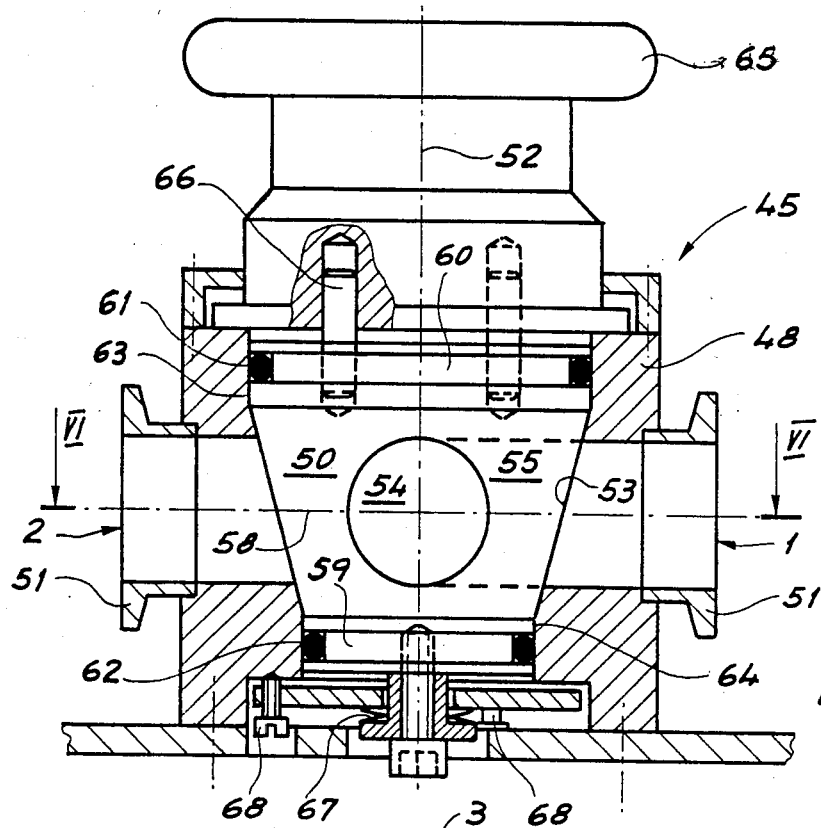
FIG. 5 is a cross-section of one of the valves shown on FIGS. 4a to 4c.
Figure 6:
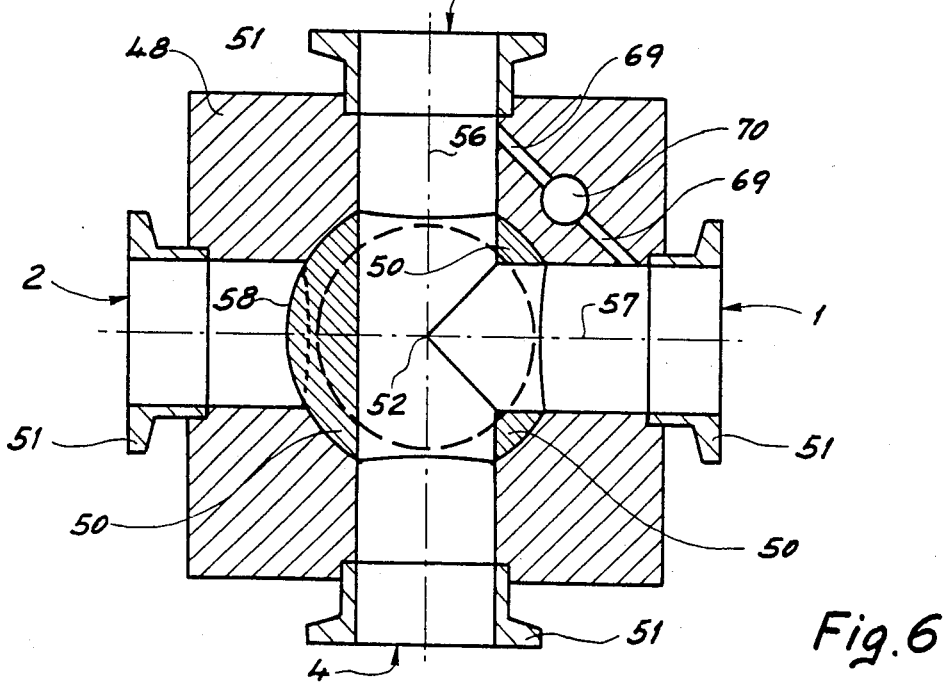
FIG. 6 is a cross-section according to line VI—VI of FIG. 5.

FIGS. 5 and 6 show in detail how the valve 45 of FIGS. 4a to 4c may be constructed. It is noted that for reasons of symmetry valve 47 is identical. FIG. 5 is a cross-section of valve 45 and FIG. 6 is a cross-section according to line VI—VI shown on FIG. 5.

Valve body 48 is comprised principally of a cubical body pierced with four orifices 1 to 4 on each of which is fitted a portal 51. The movable element 50 which has been fitted in the valve body 48 has the form of a truncated cone which may turn about its axis 52. Element 50 is mounted in a seat 53 of the same truncated form cut into the valve body. The truncated element 50 is provided with two mutually perpendicular bores 54 and 55, the axes 56 and 57 of which are situated in a plane 58 perpendicular to the axis 52 of the truncated cone 50, the first bore 54 being cut along a diameter of the circle formed by the intersection of this plane and the frustrum of the cone 50 and the second 55 according to a radius of the same circle. It will naturally be arranged that the bores 54 and 55 are situated at the same level as orifices 1 to 4 pierced in the valve body. The movable element 15 may thus be arranged in a first position shown on FIG. 4a for which orifices 1, 2 and 4 are coupled, in a second position shown on FIG. 4b and on FIGS. 5 and 6, for which orifices 1, 3 and 4 are coupled and in a third position shown on FIG. 4c for which orifices 1, 2 and 3 are coupled.

In order to assure perfect sealing of the truncated element 50 in its seat 53, FIG. 5 shows that it is terminated at each of its extremities by a cylindrical extension 59 and 60. Each of these extensions is provided with a groove in which may be housed a packing 62 and 61 which cooperates with the cylindrical extensions 64 and 63 borne by the seat 53 of the valve body. FIG. 5 also shows that the movable element is provided with a control handle 65 secured by screws 66. The same element 50 is retained within its seat 53 by elastic means shown in the form of a spring 67. The drawing shows that in tightening more or less screws 68 one may bring about variation of the force of application of the movable element 50 to its seat 53. To avoid gripping of the element in its seat, one of the surfaces in contact, e.g. the truncated element may be coated with an anti-friction layer. This may be advantageously obtained by a PVD deposition of molybdenum sulphide ($MoS_2$).

The invention is not limited to the truncated form of the movable element. This could also be a cylinder which could however present sealing defects following wear.

Finally, it will be noted that the valve which has just been described may bear, for the same reasons as those given above, a shunt between orifices 1 and 3. FIG. 6 shows this shunt which comprises a first passage 69 interrupted by a second passage 70 to which is fitted a blocking stem (not shown).

What I claim is:

1. A gas laser including a resonant cavity terminated by a first and a second mirror, a discharge tube located between said mirrors for producing a luminous beam, a gas source the discharge rate of which is controllable, a manometer to measure the gas pressure prevailing within the cavity, pumping means for removing air or gas from within the cavity, a first valve placed between the first end of the tube and the first mirror and a second valve placed between the second end of the tube and the second mirror, said valves selectively enabling communication at least between the pumping means and the resonant cavity, each said valve including a body pierced with orifices and a movable element fitted within said body and movable between a first working position in which the luminous beam produced in the discharge tube traverses the valves to reach the mirrors, the pumping means being isolated from the cavity, a second position for permitting mirror access in which said mirrors are isolated from the discharge tube and the pumping means and a third position for changing gas in which the cavity is placed in communication with the pumping means thereby to remove the gas contained in said cavity.

2. A gas laser as set forth in claim 1 wherein the first valve selectively places the resonant cavity in communication with the manometer and the second valve selectively places the resonant cavity in communication with the gas source.

3. A gas laser as set forth in claim 1 wherein the first valve is provided with a shunting means to enable circulation of fresh gas from said gas source through said discharge tube to said pumping means, said shunting means being operable when the movable element is placed in the first position.

4. A gas laser as set forth in claim 2 wherein the body of the first valve includes a first orifice coupled to the discharge tube, a second orifice coaxial with the first orifice coupled to a first chamber supporting the first mirror, a third orifice the axis of which intersects the axis of the first and second orifices substantially at a right angle coupled to the pumping means and a fourth orifice coaxial with the third orifice coupled to the manometer, and the body of the second valve includes a first orifice coupled to the discharge tube, a second orifice coaxial with the first orifice coupled to a second chamber supporting the second mirror, a third orifice the axis of which intersects the axis of the first and second orifices substantially at a right angle coupled to the pumping means and a fourth orifice coaxial with the third orifice coupled to the gas source.

5. A gas laser as set forth in claim 4 wherein the movable element fitted within the body of the first and second valves takes the form of a flap the axis of rotation of which is outside the path traversed by the luminous beam reflected by the mirrors, said flap being movable to a first position in which the third orifice of each of the valve bodies is blocked, to a second position substantially perpendicular to the first position in which the second orifice of each of the valve bodies is blocked, and to a third position situated midway between the first and second positions in which none of the four orifices of each of the valve bodies is blocked.

6. A gas laser as set forth in claim 4 wherein the movable element fitted within the body of the first and second valves takes the form of a truncated cone frustrum arranged to turn around its axis and mounted in a seat in the valve body having the same form, said cone frustrum being provided with two mutually perpendicular bores, the axes of which are located in a plane perpendicular to the axis of the cone frustrum, the first bore being along a diameter of a circle formed by the intersection of such plane and the cone frustrum and the second bore being along a radius of the same circle so as to result in a T formed opening, said bores being placed at the same level as the orifices pierced in the valve body, said movable element being movable to a first position in which the first, second and fourth orifices of the valve body are coupled, a second position in which the first, third and fourth orifices of the valve body ar coupled, and a third position in which the first, second and third orifices of the valve body are coupled.

7. A gas laser as set forth in claim 6 wherein the truncated movable element is terminated at each of its ends by a cylindrical extension, a groove being formed in the periphery of said extensions so as to retain a packing element arranged to cooperate with cylindrical extensions borne by the seat of the valve body.

8. A gas laser as set forth in claim 6 wherein the truncated movable element is retained within the valve body by elastic means, said movable element bearing a control handle.

9. A gas laser as set forth in claim 6 wherein the outer surface of the cone frustrum is coated with an anti-friction layer.

* * * * *